(12) United States Patent
Kautzsch et al.

(10) Patent No.: US 10,386,255 B2
(45) Date of Patent: Aug. 20, 2019

(54) PRESSURE SENSOR DEVICE AND MANUFACTURING METHOD

(71) Applicant: Infineon Technologies Dresden GmbH, Dresden (DE)

(72) Inventors: Thoralf Kautzsch, Dresden (DE); Heiko Froehlich, Radebeul (DE); Marco Haubold, Dresden (DE); Andre Roeth, Dresden (DE); Maik Stegemann, Pesterwitz (DE); Mirko Vogt, Dresden (DE)

(73) Assignee: Infineon Technologies Dresden GmbH, Dresden (DE)

( * ) Notice: Subject to any disclaimer, the term of this patent is extended or adjusted under 35 U.S.C. 154(b) by 184 days.

(21) Appl. No.: 15/647,360

(22) Filed: Jul. 12, 2017

(65) Prior Publication Data
US 2018/0017456 A1    Jan. 18, 2018

(30) Foreign Application Priority Data

Jul. 12, 2016  (DE) ................ 10 2016 212 693

(51) Int. Cl.
*G01L 9/00* (2006.01)
*G01L 19/06* (2006.01)
*G01L 19/14* (2006.01)

(52) U.S. Cl.
CPC .......... *G01L 9/0042* (2013.01); *G01L 9/0045* (2013.01); *G01L 9/0048* (2013.01);
(Continued)

(58) Field of Classification Search
CPC ....... G01L 9/00; G01L 9/0042; G01L 9/0045; G01L 9/0048; G01L 9/0054; G01L 9/0073; G01L 19/06; G01L 19/0618; G01L 19/14
See application file for complete search history.

(56) References Cited

U.S. PATENT DOCUMENTS

2010/0116632 A1   5/2010  Smith et al.
2016/0299025 A1*  10/2016 Chen .................. G01L 9/0042
(Continued)

FOREIGN PATENT DOCUMENTS

| DE | 102015208689 A1 | 11/2015 |
| DE | 102015211777 A1 | 12/2015 |
| DE | 102015116353 A1 | 5/2016 |

OTHER PUBLICATIONS

German Patent Office, Office Action issued for DE 102016212693.8, dated Dec. 7, 2016, 6 pages.

*Primary Examiner* — Nguyen Q. Ha
(74) *Attorney, Agent, or Firm* — Schiff Hardin LLP

(57) ABSTRACT

A manufacturing method includes providing a semiconductor substrate having a pressure sensor structure; and forming, during a BEOL process (BEOL=back-end-of-line), a metal-insulator-stack arrangement on the semiconductor substrate, wherein the metal-insulator-stack arrangement is formed to comprise (1) a cavity adjacent to the pressure sensor structure and extending over the pressure sensor structure, and (2) a pressure port through the metal-insulator-stack arrangement for providing a fluidic connection between the cavity and an environmental atmosphere, wherein the pressure port has a cross-sectional area, which is smaller than 10% of a footprint area of the pressure sensor structure within the cavity.

26 Claims, 7 Drawing Sheets

(52) U.S. Cl.
 CPC .......... *G01L 9/0054* (2013.01); *G01L 9/0073* (2013.01); *G01L 19/0618* (2013.01)

(56) References Cited

U.S. PATENT DOCUMENTS

| | | | |
|---|---|---|---|
| 2017/0016788 A1* | 1/2017 | Ned | G01L 19/04 |
| 2017/0205301 A1* | 7/2017 | Reinmuth | B81B 7/0074 |
| 2017/0217760 A1* | 8/2017 | Piechocinski | B81B 7/0061 |

* cited by examiner

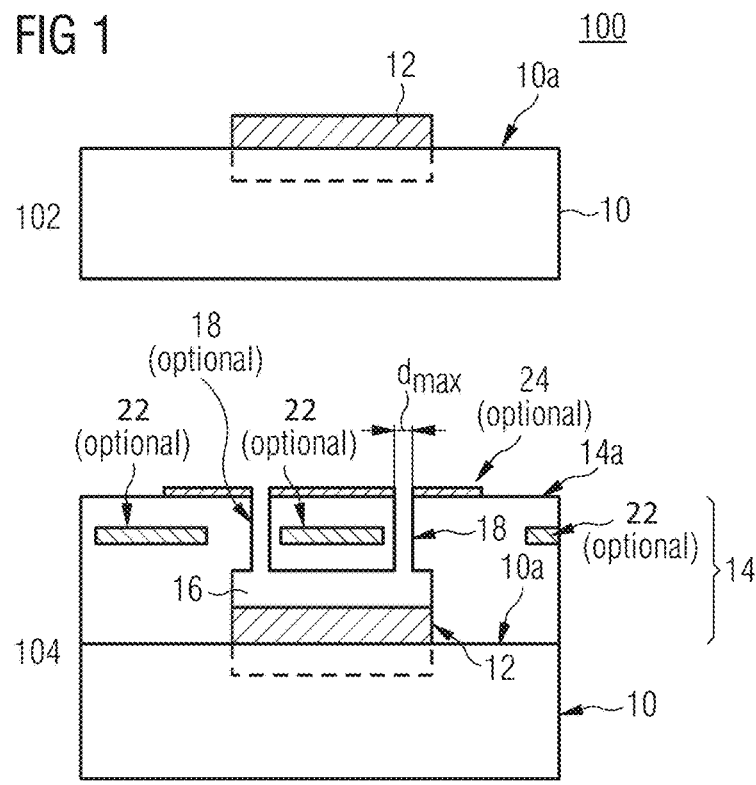
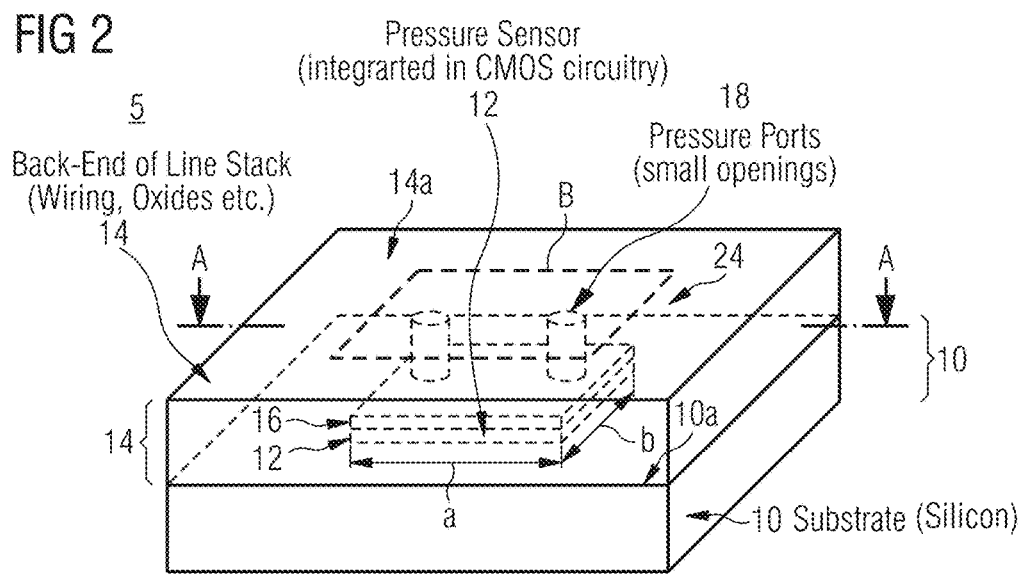

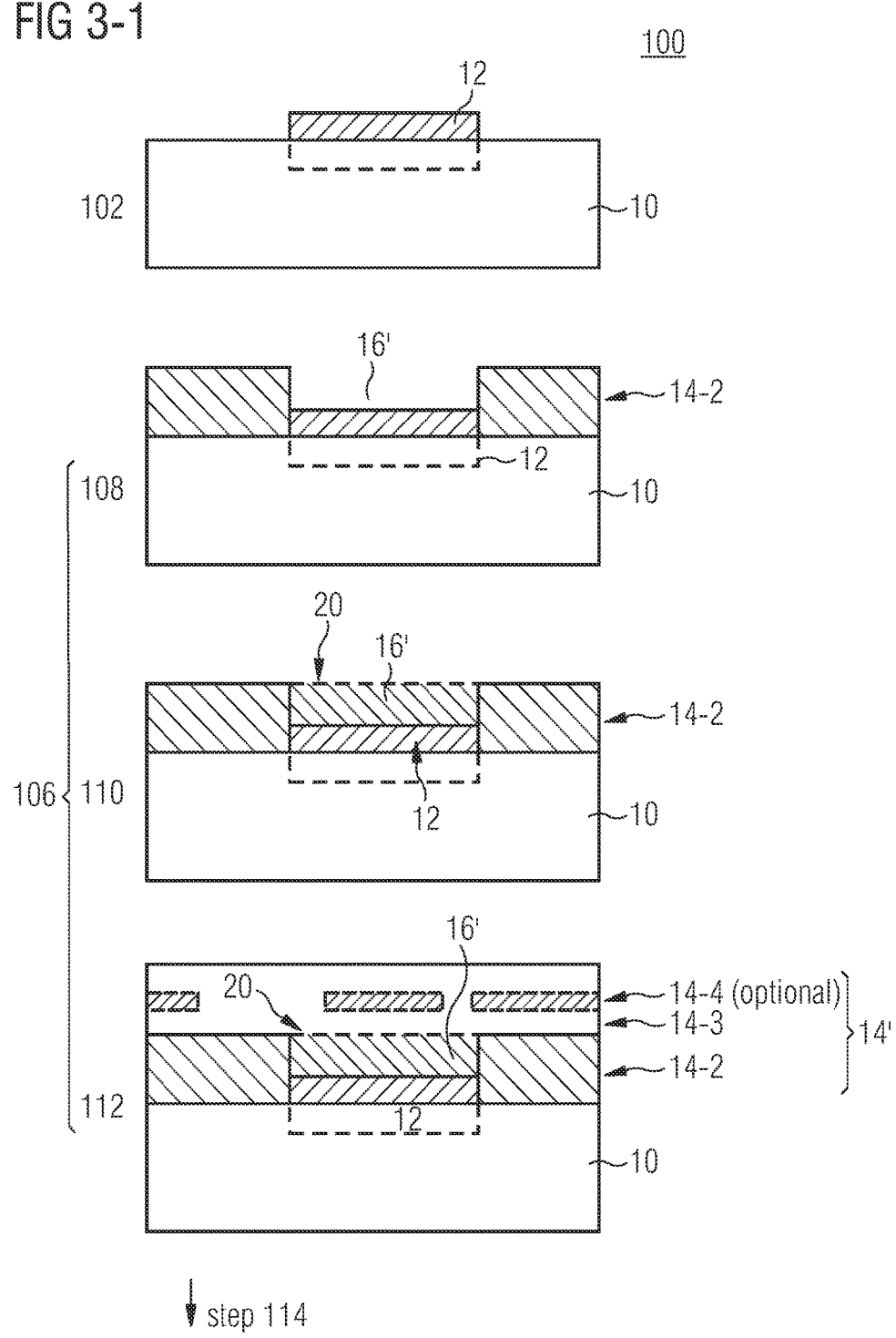

$104 = 106 + 114 + 116$

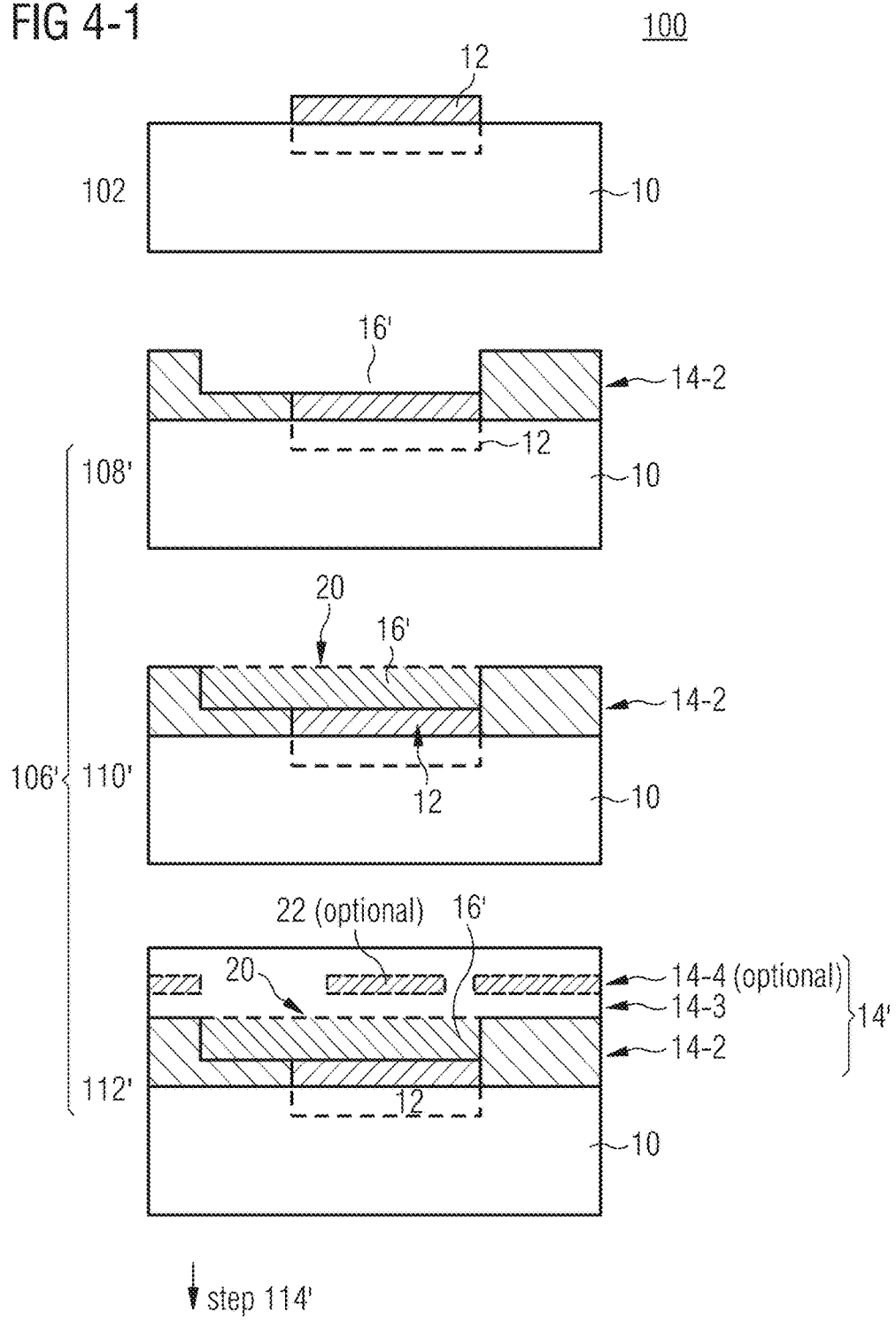

104=106'+114'+116'

PRESSURE SENSOR DEVICE AND MANUFACTURING METHOD

TECHNICAL FIELD

Embodiments relate to a manufacturing method, e.g. a method for manufacturing a pressure sensor device. Further embodiments relate to a pressure sensor structure. Further embodiments relate to a pressure sensing system comprising a protective shield for the pressure sensor structure(s).

BACKGROUND

Integrated pressure sensors are high-volume products for automotive and consumer applications. An ongoing miniaturization leads to sensor systems with very small ("tiny") dimensions in the range of a few tenths of microns, e.g. in the thickness direction. These sensor devices may nevertheless have an excellent sensitivity, e.g. down to the range of Pascals ($Pa=1 \text{ N/m}^2$). On the other hand, small disturbances to the pressure sensors may lead to remarkable measurement errors. These measurement deviations or disturbances may come from internal or package-induced stress, temperature changes, humidity, external electric fields or particle contamination of the sensor structure(s), e.g. of the pressure membrane.

Generally, there is a need in the art for an improved approach for the architecture of pressure sensor arrangements and the methods for manufacturing the same. Such an approach should result in an unelaborate and inexpensive fabrication process which allows a further downscaling or miniaturization of pressure sensor arrangements/devices.

SUMMARY

Embodiments provide a manufacturing method comprising providing a semiconductor substrate having a pressure sensor structure; and forming, during a BEOL process (BEOL=back-end-of-line), a metal-insulator-stack arrangement on the semiconductor substrate, wherein the metal-insulator-stack arrangement is formed to comprise (1.) a cavity adjacent to the pressure sensor structure and extending over the pressure sensor structure, and (2.) a pressure port through the metal-insulator-stack arrangement for providing a fluidic connection between the cavity and an environmental atmosphere, wherein the pressure port has a cross-sectional area, which is smaller than 10% of a footprint area of the pressure sensor structure within the cavity.

According to a further embodiment, the step of forming, during the BEOL process, the metal-insulator-stack arrangement further comprises the step of forming, during the BEOL process, a metal-insulator-stack on the semiconductor substrate, wherein the metal-insulator-stack comprises a recess which is adjacent to the pressure sensor structure and extends over the pressure sensor structure, the recess being at least partially filled with a sacrificial material; forming an access port through the metal-insulator-stack to the sacrificial material in the recess, and forming the cavity by removing the sacrificial material through the access port.

According to a further embodiment, the step of forming the access port further comprises the step of release etching, from a surface region of the metal-insulator-stack towards the semiconductor substrate, for generating a kerf or trench as the access port in the metal-insulator-stack to the recess with the sacrificial material.

According to a further embodiment, the access port is also configured to form the pressure port through the metal-insulator-stack arrangement for providing the fluidic connection between the cavity and the environmental atmosphere.

According to a further embodiment, the pressure port has a cross-sectional area so that any square (quadrat), rectangular area or round (e.g. circular) area continuously formable in the pressure port in parallel to a surface area of the semiconductor substrate is smaller than 1 μm².

According to a further embodiment, the step of forming the pressure sensor structure further comprises forming a mechanical spring structure between a region of the semiconductor substrate carrying the pressure sensor structure and a remaining semiconductor substrate region for providing a mechanical stress decoupling of the pressure sensor structure from the remaining semiconductor substrate region.

Further embodiments provide a pressure sensor device comprising a semiconductor substrate with a pressure sensor structure; a metal-insulator-stack arrangement on the semiconductor substrate, wherein the metal-insulator-stack arrangement comprises a cavity adjacent to the pressure sensor structure and extending over the pressure sensor structure; and a pressure port through the metal-insulator-stack arrangement for providing a fluidic connection between the cavity and an environmental atmosphere, wherein the pressure port has a cross-sectional area, which is smaller than 10% of the footprint area of the pressure sensor structure within the cavity.

According to a further embodiment, the pressure port through the metal-insulator-stack arrangement for providing a fluidic connection between the cavity and the environmental atmosphere has a cross-sectional area so that any square, rectangular area or round (e.g. circular) area formable in the pressure port in parallel to a surface region of the semiconductor substrate is smaller than 1 μm².

According to a further embodiment, the cavity extends laterally beyond the pressure sensor structure, and wherein the pressure port forms the fluidic connection through the metal-insulator-stack arrangement to an edge region of the cavity.

According to a further embodiment, at least one metal layer structure of the metal-insulator-stack arrangement is formed as a metal shield, which is, with respect to the semiconductor substrate, at least partially arranged above the pressure sensor structure.

According to a further embodiment, a hydrophobic and/or oleophobic surface layer is formed on the metal-insulator-stack arrangement.

According to a further embodiment, the pressure sensor structure comprises a capacitive pressure sensor structure with a poly-silicon lamella on the semiconductor substrate.

According to a further embodiment, the pressure sensor structure comprises a piezo-resistive pressure sensor structure with a silicon lamella in the semiconductor substrate.

According to a further embodiment, the pressure sensor structure comprises a mechanical spring structure between a region of the semiconductor substrate carrying the pressure sensor structure and a remaining semiconductor substrate region for providing a mechanical stress decoupling of the pressure sensor structure from the remaining semiconductor substrate region.

Further embodiments relate to a pressure sensing system comprising at least one sensor apparatus, wherein the at least one sensor apparatus comprises a protective shield for the pressure sensor structure on the semiconductor substrate, wherein the protective shield is formed by the metal-insulator-stack arrangement having the pressure port. According to a further embodiment the pressure sensing system comprises CMOS circuits having a sensor signal read-out and sensor signal processing functionality Thus, the present manufacturing method (for fabricating a pressure sensor device), the pressure sensor device, and the pressure sensing system provides for a new structuring concept of BEOL layers on top of a pressure sensor device (or pressure sensing array) comprising at least one (or a plurality of) pressure sensitive membrane(s), wherein the newly structured BEOL layers provide for a shielding from external impacts, e.g. dust, electrical fields, wetting, etc.

The newly structured BEOL layers may comprise a (relatively large) buried cavity above the membrane(s) or membrane array and provides one or multiple pressure ports in the form of "small" openings in the BEOL stack between the cavity and the environmental atmosphere. The newly structured BEOL layers may further comprise at least one (or a plurality of) structured metallization layer(s), which may function as metal shield(s) for the membrane(s) in the newly structured BEOL stack.

Based on this concept, an integration of pressure sensors into next generation mobile phones and mobile devices may be strongly supported. Based on the present concept, height (thickness) limits of the resulting pressure sensor devices can be chosen well below 1 mm, wherein the capability is foreseeable to further reduce the (thickness) dimension of the resulting pressure sensor arrangements continuously in the near future. On-chip implementation of stress decoupling and, also, shielding against fine dust, electric fields or wetting are key features for next generation MEMS devices which can be implemented based on the present concept.

BRIEF DESCRIPTION OF THE DRAWINGS

Various embodiments are described herein making reference to the appended drawings and figures.

FIG. 1 shows a schematic flowchart with the method steps of a manufacturing method (e.g. for fabricating a sensor apparatus) according to an embodiment;

FIGS. 3-1-3-2 shows a schematic flowchart with the method steps of the manufacturing method according to a further embodiment;

FIGS. 4-1-4-2 shows a schematic flowchart with the method steps of the manufacturing method according to a further embodiment;

Figure 3:
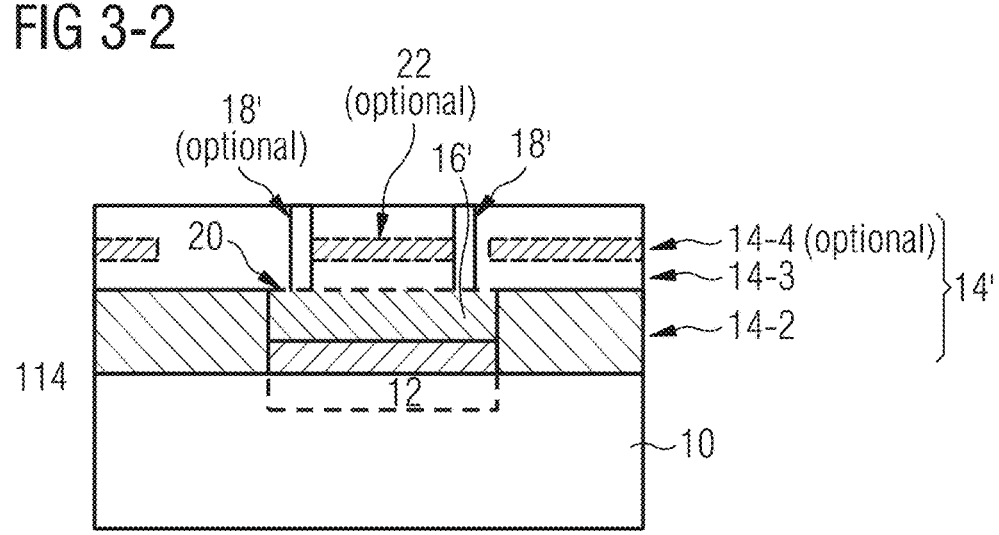

Before discussing the embodiments in further detail using the drawings and figures, it is pointed out that in the figures/drawings and the specification identical elements and elements having the same functionality and/or same technical or physical effect are usually provided with the same reference number or identified with the same name/term, so that the description of these elements and of the functionality thereof as illustrated in the different embodiments are mutually exchangeable and may be applied to one another in the different embodiments which may relate to different figures/drawings.

In the following description, different embodiments are discussed in detail, however, it should be appreciated that the different embodiments provide many applicable concepts that can be embodied in a wide variety of (pressure) sensor devices and the corresponding manufacturing methods thereof. The specific embodiments discussed are merely illustrative of specific ways to make and use the present concept, and do not limit the scope of the claims. In the following description of embodiments, the same or similar elements having the same function have associated therewith the same reference signs or the same name/term, and a description of such elements will not be repeated for every embodiment. Moreover, features of the different embodiments described hereinafter may be combined with each other, unless specifically noted otherwise.

FIG. 1 shows a schematic flowchart with method steps 102, 104 of a manufacturing method 100, e.g. for fabricating a pressure sensor device, according to an embodiment. As shown in step 102 of FIG. 1, a semiconductor substrate 10 having a pressure sensor structure 12 is provided. The pressure sensor structure 12 may be arranged at the semiconductor substrate 10, e.g. a silicon substrate. To be more specific, the sensor structure 10 may be arranged and/or at least partially integrated in the semiconductor substrate 10. In this connection, it is also referred to FIGS. 5a-b and the associated specification relating to different, exemplary pressure sensor structures 12 arranged at the semiconductor substrate 10.

In general, the pressure sensor structure 12 may be implemented as an absolute pressure sensor structure for measuring the pressure relative to a (perfect) vacuum, a gauge pressure sensor for measuring the pressure relative to an atmospheric pressure, or a differential pressure sensor for measuring the difference between two pressures, one connected to each side of the sensor structure. Moreover, the pressure sensor structure 12 may have, for example, a piezo-resistively and/or capacitively read out functionality. As indicated by the dotted line, the pressure sensor structure 12 may be (1.) completely arranged on the semiconductor substrate 10, (2.) integrated completely in the semiconductor substrate 10 or (3.) partially arranged on the semiconductor substrate 10 and partially integrated in the semiconductor substrate 10.

In step 104, a metal-insulator-stack arrangement 14 is formed, e.g. during a BEOL process (BEOL=back-end-of-line) on the semiconductor substrate 10, wherein the metal-insulator-stack arrangement 14 is formed to comprise a cavity 16 adjacent to the pressure sensor structure 12 and extending over the pressure sensor structure 12, and at least one pressure port 18 through the metal-insulator-stack arrangement 14 for providing a fluidic connection between the cavity 16 and an environmental atmosphere, wherein the at least one pressure port 18 has a cross-sectional area, which is smaller than 10% of a footprint area of the pressure sensor structure 12 within/below the cavity 16.

Alternatively to the relative indication of size of the at least one pressure port 18, as indicated above, the pressure port 18 may have a maximum diameter $d_{max}$ which is smaller than 2 µm, 1 µm, 0.5 µm or 0.3 µm (e.g. between 2 µm, 1 µm, 0.5 µm or 0.3 µm, and 0.2 µm). Alternatively, the at least one pressure port 18 may have a cross-sectional area so that any square (quadrat), rectangular area or round (e.g. circular) area formable in the pressure port (e.g. at the surface 14a of the metal-insulator-stack arrangement 14) in parallel to a surface area region 10a of the semiconductor substrate 10 is smaller than 4 µm², 2 µm², 1 µm², 0.5 µm², 0.25 µm² or 0.1 µm² for example (e.g. between 4 µm², 2 µm², 1 µm², 0.5 µm², 0.25 µm² or 0.1 µm², and 0.04 µm²).

The step 102 of providing the semiconductor substrate 10 with the pressure sensor structure 12 further comprises the (sub-)steps of forming during an FEOL process (FEOL=front-end-of-line) CMOS (CMOS=complementary metal-oxide-semiconductor) circuit elements (not shown in FIG. 1) on the semiconductor substrate 10, and forming during an MOL process (MOL=middle-of-line) the pressure sensor structure (at least partially) on the semiconductor substrate 10. Thus, the pressure sensor structure 12 may comprise a capacitive pressure sensor structure with a poly-silicon lamella (not shown in FIG. 1).

Alternatively, the step of providing 102 a semiconductor substrate 10 with a pressure sensor structure 12 may comprise the further step of forming during an FEOL process CMOS circuit elements (not shown in FIG. 1) on the semiconductor substrate 10, e.g. with a standard CMOS process, and also the pressure sensor structure 12 at least partially in the semiconductor substrate. The pressure sensor structure 12 may comprise a piezo-resistive pressure sensor structure with a silicon lamella (not shown in FIG. 1) in the semiconductor substrate 10.

In the present context, a front-end-of-line (FEOL) process may be regarded as the first portion of IC fabrication, where the individual devices (e.g. transistors, capacitors, resistors, etc.) are patterned in the semiconductor substrate. The FEOL process may generally cover all process steps (e.g. all semiconductor processing steps) up to (but not including) the deposition of metal interconnect layers (a metal-insulator-stack arrangement). A mid-of-line (MOL) process may follow the FEOL process, wherein any further process steps, e.g. for fabricating pressure sensor structures, for example on the surface area of the semiconductor substrate, are conducted. MOL processes may also be regarded as part of the FEOL process. The back-end-of-line (BEOL) process may be regarded as the second (main) portion of IC fabrication, where the individual devices (transistors, capacitors, resistors, etc.) get interconnected with wiring on the wafer, i.e. with metallization layers which are arranged in isolator layers.

In the step of forming the pressure sensor structure 12, a mechanical spring structure (not shown in FIG. 1) may be formed between a region of the semiconductor substrate 10 carrying the pressure sensor structure 12 and the remaining semiconductor substrate for providing a mechanical stress decoupling of the pressure sensor structure 12 from the remaining semiconductor structure 10.

Moreover, in the step 104 of forming the metal-insulator-stack arrangement 14 a plurality of insulator layer structures and a plurality of metal layer structures may be formed in an alternating manner on (the surface region 10a of) the semiconductor substrate 10. Moreover, electrically conductive vias (not shown in FIG. 1) may be provided in the metal-insulator-stack arrangement 14 to provide an electrical connection to contact areas of (integrated) circuits (not shown in FIG. 1) on the semiconductor substrate 10, between different metal layer structures, to supply voltages etc.

At least one metal layer structure 22 of the metal-insulator-stack arrangement is formed as an optional metal shield, which is at least partially arranged with respect to the surface region 10a of the semiconductor substrate 10 above the pressure sensor structure 12. Moreover, at least a portion of the surface region 14a of the metal-insulator-stack arrangement 14 may comprise a hydrophobic and/or oleophobic surface layer 24. The hydrophobic and/or oleophobic surface layer 24 may be applied on the surface area 14a of metal-insulator-stack arrangement 14 and a least in an region "around" (e.g. adjacent to and/or in) the at least on pressure port 18.

Figure 2:
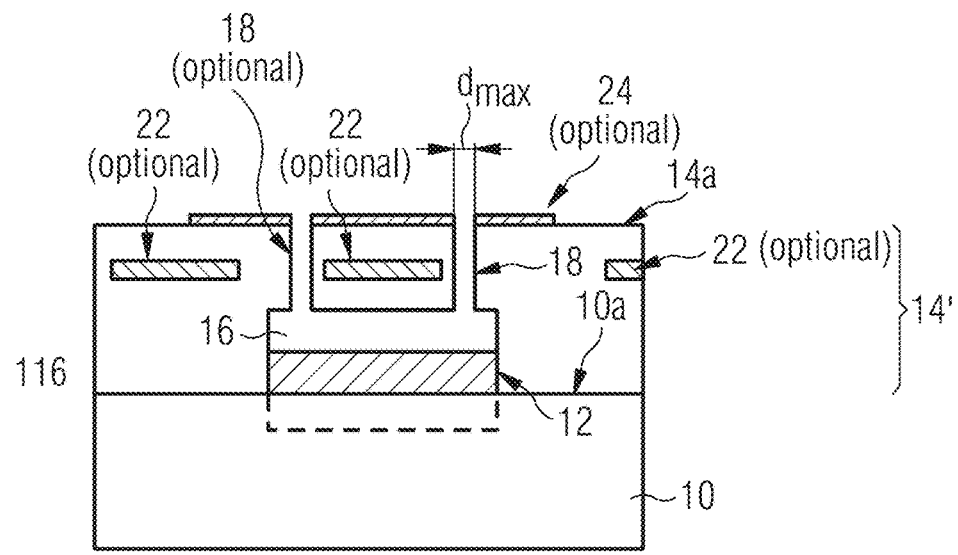
FIG. 2 shows a schematic perspective view of an exemplary pressure sensor device according to an embodiment.

FIG. 2 shows a schematic perspective view of an exemplary pressure sensor device 5 according to an embodiment. To be more specific, the pressure sensor device 5 as shown in FIG. 2 may be achieved with the manufacturing method as described with FIG. 1, wherein the illustration of the fabricated pressure sensor device 5 in step 104 of FIG. 1 can be regarded as a cross-sectional view along the cross-sectional line AA in FIG. 2.

As shown in FIG. 2, the pressure sensor device 5 comprises the semiconductor substrate 10 with the pressure sensor structure 12. The metal-insulator-stack arrangement 14 is arranged on a surface region 10a of the semiconductor substrate 10, wherein the metal-insulator-stack arrangement 14 comprises the cavity 16 adjacent to the pressure sensor structure 12 and extending over the pressure sensor structure 12. The pressure sensor device 5 further comprises at least one pressure port 18 through the metal-insulator-stack arrangement 14 for providing a fluidic connection between the cavity 16 and the environmental atmosphere, i.e. for providing a fluidic access from the environmental atmosphere to the cavity 16. The at least one pressure port 18 has a cross-sectional area (e.g. at the surface region 14a of the metal-insulator-stack arrangement 14), which is smaller than 20%, 10%, 5% or 1% of the footprint area A="a*b" of the pressure sensor structure 12 within/below the cavity 16.

In other words, the at least one pressure port 18 through the metal-insulator-stack arrangement 14 for providing a fluidic connection between the cavity 16 and the environmental atmosphere may have a maximum diameter $d_{max}$ of some 10 to 100 nm (e.g. n*10 to n*100 nm with n=1, 2, 3, . . . or 10). The at least one pressure port 18 may have a maximum diameter $d_{max}$ between 10 and 500 nm or between 50 and 250 nm. Alternatively, $d_{max}$ may be chosen to be smaller than 2 µm, 1 µm, 0.5 µm, 0.3 µm. To be more specific, the at least one pressure port 18 may have a cross-sectional area (e.g. at the surface region 14a of the metal-insulator-stack arrangement 14), so that any square, rectangular or circular area formable in the pressure port (e.g. at the surface region 14a of the metal-insulator-stack arrangement 14) in parallel to the surface region 10a of the semiconductor substrate 10 is smaller than 4 µm², 2 µm², 1 µm², 0.5 µm², 0.25 µm², or 0.1 µm² etc.

In a further embodiment, the cavity 16 may extend laterally beyond the pressure sensor structure 12, wherein the at least one pressure port 18 may be formed to provide the fluid connection through the metal-insulator-stack arrangement 14 to an edge region of the cavity 14.

Moreover, at least one metal layer structure (not shown in FIG. 2) of the metal-insulator-stack arrangement 14 may be formed as a metal shield, which is at least partially arranged (with respect to the surface region 10a of the semiconductor substrate 10) above the pressure sensor structure 12.

Furthermore, the metal-insulator-stack arrangement 14 may comprise a hydrophobic and/or oleophobic surface layer 24. The hydrophobic and/or oleophobic surface layer 24 may be arranged on the surface area 14a of metal-insulator-stack arrangement 14 and a least in an surface area B "around" the at least on pressure port 18. Furthermore, the pressure sensor structure 12 may comprise a capacitive pressure sensor structure with a poly-silicon lamella on the semiconductor substrate 10. Alternatively, the pressure sensor structure 12 may comprise a piezo-resistive pressure sensor structure 12 with a silicon lamella (integrated) in the semiconductor substrate 10.

Based on the concept as described with respect to FIGS. 1 and 2, an effective shield for a pressure sensor structure on a semiconductor substrate can be provided that protects the pressure sensor structure 12 effectively from external impairments (e.g. adverse influences) such as fine dust. Furthermore, in case the metal-insulator-stack arrangement further comprises at least one metal layer structure 22, which is formed as a metal shield and which is at least partially arranged with respect to the semiconductor substrate above the pressure sensor structure 12, an additional protection against external electrical fields can be provided. Moreover, in case an optional hydrophobic and/or oleophobic surface layer is formed on the surface region 14a of the metal-insulator-stack arrangement 14, the option is offered to provide an effective protection against liquids or humidity. The resulting structure of the manufacturing method 100, i.e. the pressure sensor device 5, minimizes the efforts for its replication by using the back-end-of-line (BEOL) stack 14 as the shielding material. The resulting shielding structure is applied in combination with a mid-of-line integrated pressure sensing structure 12.

The pressure sensing structure 12 may further comprise a mechanical spring structure (not shown in FIGS. 1 and 2) between the semiconductor substrate region carrying the pressure sensor structure 12 and the remaining semiconductor substrate for providing a mechanical stress decoupling of the pressure sensor structure 12 from the remaining (main part of) semiconductor substrate 10. As the at least one pressure port 18, through the metal-insulator-stack arrangement 14, which provides a fluidic access from the environmental atmosphere to the cavity, is implemented as a small opening, having for example a diameter in the range of some ten to hundred nanometers (10 to 500 or 50 to 250 nm), such small openings can effectively prevent particles (e.g. fine dust particles) to impact the pressure sensor structure 12, wherein the buried large cavity 16 is used to distribute the atmosphere pressure over the pressure sensing structure 12, e.g. the sensor membranes or lamellas.

To be more specific, the small opening(s) 18 provides a pressure port from the outside atmosphere to an extended cavity 16 above the pressure sensing structure 12, which may comprise single pressure sensing elements or a pressure sensing membrane array. In this way, large particles (e.g. greater than the diameter $d_{max}$ of the "small" pressure ports 18, are kept above the BEOL layer 14 and away from the pressure sensing structure 12. As will be explained in detail below, the inner cavity 16 may be fabricated by means of a carbon sacrificial layer. This layer may then be removed after the structuring process for the small opening(s) is finished. As indicated above, the pressure sensor structure 12 may be integrated in a CMOS circuitry on the semiconductor substrate 10, e.g. a silicon substrate. The back-end-of-line stack 14 may comprise wiring and oxide layers, etc.

FIG. 3 show a schematic flowchart with the method steps of a manufacturing method 100, e.g. for fabricating a pressure sensor device 5, according to a further embodiment.

In a step 102, a semiconductor substrate 10 having a pressure sensor structure 12 is provided. The pressure sensor structure 12 may comprise a capacitive pressure sensor structure with a polysilicon lamella. In that case, the step 102 of providing the semiconductor substrate 10 with the pressure sensor structure 12 may comprise the sub-steps of forming, during an FEOL process with a standard CMOS process, CMOS circuit elements on the semiconductor substrate 10, and forming during an MOL (mid-of-line) process the pressure sensor structure 12 on the semiconductor substrate 10. The MOL process may be part of the FEOL process or may (directly) follow the FEOL process.

Moreover, (alternatively) the pressure sensor structure 12 may comprise a piezo-resistive pressure sensor structure with a silicon lamella (integrated) in the semiconductor substrate 10. Thus, the step 102 of providing the semiconductor substrate 10 with the pressure sensor structure 12 may comprise the sub-step of forming, during an FEOL process with a standard CMOS process, CMOS circuit elements on the semiconductor substrate, for example, and also the sensor pressure structure 12 (at least partially) in the semiconductor substrate 10. For fabricating the pressure sensor structure 12 in the semiconductor substrate 10 so-called silicon-on-nothing (SON) processes (Venezia processes) can be used.

The step of forming the pressure sensor structure 12 may further comprise the optional step of forming a mechanical spring structure between the semiconductor region carrying the pressure sensor structure 12 and a remaining semiconductor region for providing a mechanical stress decoupling of the pressure sensor structure 12 from the remaining semiconductor substrate region.

In the following, it is explained how the step 104 of forming, during a BEOL process, a metal-insulator-stack arrangement 14 on the semiconductor substrate 10 may be conducted. The step 104 of forming, during the BEOL process, the metal-insulator-stack arrangement further comprises the step of forming 106, during the BEOL process, a metal-insulator-stack 14' on the semiconductor substrate 10, wherein the metal-insulator-stack 14' comprises a recess 16', which is adjacent to the pressure sensor structure 12 and extends over the pressure sensor structure 12, wherein the recess 16' is at least partially filled with a sacrificial material 20. The step 106 of forming the metal-insulator-stack 14' may further comprise the sub-steps of forming 108 a first insulator layer structure 14-2 on the semiconductor substrate 10, wherein the first insulator layer structure 14-2 comprises the recess 16' over the pressure sensor structure 12, the step 110 of filling the recess 16' at least partially with the sacrificial material 22, and the step 112 of forming the (remaining) metal-insulator-stack 14' by forming a further insulator structure 14-3 and/or an optional metal layer structure 14-4 on the first insulator layer structure 14-2 and the sacrificial material 20. Thus, the step 106 of forming a metal-insulator-stack 14' may be conducted by the steps 108, 110 and 112.

Then, a step 114 of forming an access port 18' through the metal-insulator-stack 14-1 to the sacrificial material 20 in the recess 16' is conducted. Then, in a step 116, the cavity 16 is formed by removing the sacrificial material 20 through the access port 18'. Thus, as a result, the metal-insulator-stack arrangement 14 is finally formed.

The step 110 of filling the recess 16' at least partially with a sacrificial material 22 may further comprise the step of filling the recess 16' at least partially with a carbon sacrificial material, i.e. a sacrificial material comprising carbon. The step 110 of filling the recess 16' at least partially with the sacrificial material 20 may further comprise the steps of depositing a carbon layer as the sacrificial material 20 on the first insulator layer 14-2 and in the recess 16', and the step of structuring the carbon layer 20 so that the recess 16' is at least partially filled with the sacrificial material 20.

The step 116 of forming the cavity 16 by removing the sacrificial material 20 through the access port(s) 18' may further comprise a carbon ashing process. The step 114 of forming the access port(s) 18' may further comprise the step of release etching (oxide etch), from a surface 14a of the metal-insulator-stack 14', towards the semiconductor substrate 10 for generating a kerf or trench as the recess port in the metal-insulator-stack 14' to the recess with the sacrificial material. The access port(s) 18' may also be configured to form the pressure port(s) 18 through the metal-insulator-stack arrangement 14 for providing the fluidic connection between the cavity 16 and the environmental atmosphere.

The pressure port(s) 18 may have a cross-sectional area so that any square, rectangular area or round (e.g. circular) area formable in the pressure port (e.g. at the surface of the metal-insulator-stack arrangement 14) in parallel to a surface area 10a of the semiconductor substrate 10 is smaller than 2 µm², 1 µm², 0.5 µm² or 0.3 µm², etc.

The step 106 of forming the metal-insulator-stack 14' may further comprise the step of forming a plurality of insulator layer structures 14-2, 14-3 and a plurality of metal layer structures 14-4 on the semiconductor substrate. At least one metal layer structure 14-4 of the metal-insulator-stack 14' is formed as a metal shield 22, which is at least partially arranged with respect to the surface region 10a of the semiconductor substrate 10 above the pressure sensor structure 12.

Thus, the step 104 of forming, during a BEOL process, a metal-insulator-stack arrangement 14 on the semiconductor substrate 10 may comprise the steps 106 (=108, 110 and 112) and 114, 116. Moreover, optionally a hydrophobic and/or oleophobic surface layer 24 may be formed on the surface region 14a of the metal-insulator-stack 14' (arrangement 14).

Figure 4:
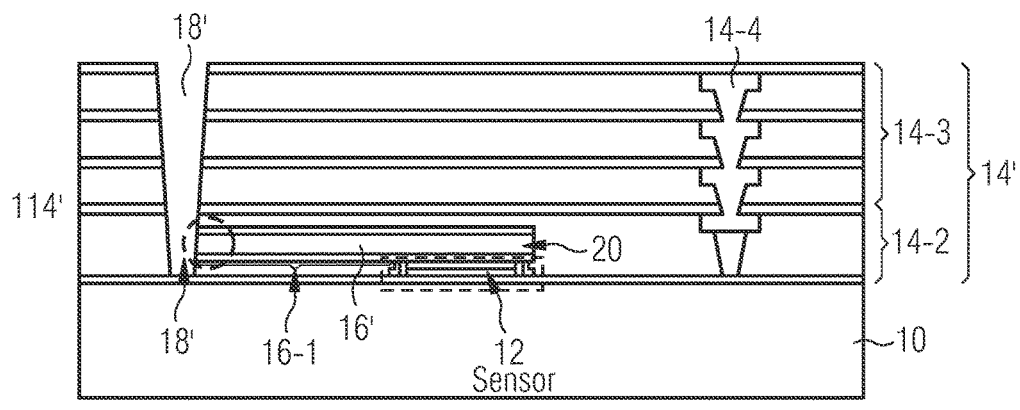
Figure 2:
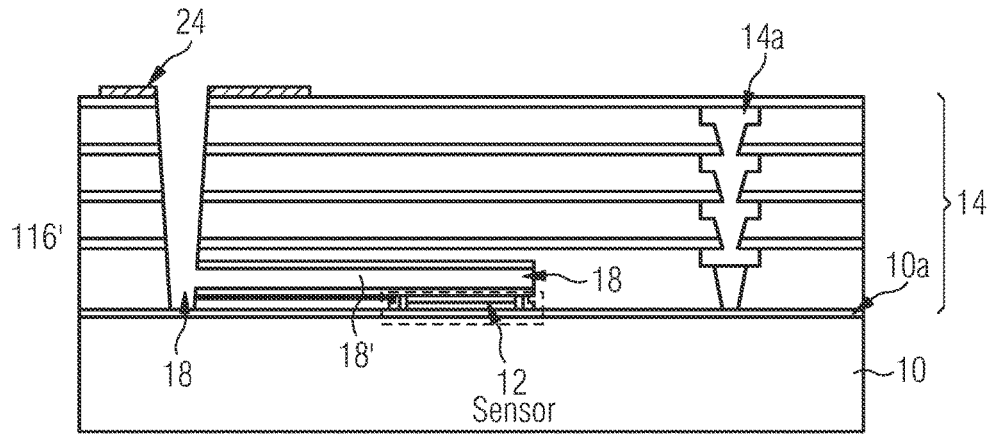

FIG. 4 shows a further schematic flowchart with the method steps of the manufacturing method 100, e.g. for fabricating a pressure sensor device, according to a further embodiment. Principally, all method steps as described in FIG. 3 are equally applicable to the further embodiment of FIG. 4. In the embodiment of FIG. 4, the recess 16 is formed to extend laterally beyond the pressure sensor structure 12.

In a step 102, a semiconductor substrate 10 having a pressure sensor structure 12 is provided.

In the following, it is explained how the step 104 of forming, during a BEOL process, a metal-insulator-stack arrangement 14 on the semiconductor substrate 10 is conducted. The step 104 of forming, during the BEOL process, the metal-insulator-stack arrangement further comprises the step of forming 106', during the BEOL process, a metal-insulator-stack 14' on the semiconductor substrate 10, wherein the metal-insulator-stack 14' comprises a recess 16', which is adjacent to the pressure sensor structure 12 and extends over the pressure sensor structure 12, wherein the recess 16' is at least partially filled with a sacrificial material 22. The step 106' of forming the metal-insulator-stack 14' may further comprise the sub-steps of forming 108' a first insulator layer structure 14-2 on the semiconductor substrate 10, wherein the first insulator layer structure 14-2 comprises the recess 16' over the pressure sensor structure 12, the step 110' of filling the recess 16' at least partially with the sacrificial material 20, and the step 112' of forming the (remaining) metal-insulator-stack 14' by forming a further insulator structure 14-3 and/or an optional metal layer structure 14-4 on the first insulator layer structure 14-2 and the sacrificial material 20. Thus, the step 106' of forming a metal-insulator-stack 14' may comprise the steps 108', 110' and 112'.

As shown in FIG. 4, in step 106', the metal-insulator-stack 14' is formed during the BEOL process on the semiconductor substrate 10, wherein the metal-insulator-stack 14' comprises the recess 16', which is adjacent to the pressure sensor structure 12, and extends over the pressure sensor structure 12, wherein the recess 16' is at least partially filled with the sacrificial material 20. As shown in step 114' of FIG. 4, the recess 16' (with the sacrificial material 20) is formed to extend laterally beyond the pressure sensor structure 12. As shown in FIG. 4, the access port 18' is formed through the metal-insulator-stack 14' to an edge region 16-1 of the recess 16' with the sacrificial material 20, wherein the edge region 16-1 of the recess 16' extends laterally beyond the pressure sensor structure 12. The step 114' of forming the access port 18' further comprises the step of release etching (oxide etch) from a surface 14a of the metal-insulator-stack 14 towards the surface region 10a of the semiconductor substrate 10, for generating a kerf or trench 18 as the access port 18 in the metal-insulator-stack 14' to the recess 16' with the sacrificial material 20. The surface region 10a of semiconductor substrate 10 may form an etch stop for the release etching step. Then, in step 116', the cavity 16 is formed by removing the sacrificial material 22 through the access port 18 for achieving the metal-insulator-stack arrangement 14. The step 116' of forming the cavity 16 by removing the sacrificial material 20 through the access port(s) 18' may comprise a carbon ashing process.

The remaining method steps as described in FIG. 3 are accordingly applicable to the embodiment of FIG. 4 having the recess 16' formed to extend laterally beyond the pressure sensor structure.

The step 110' of filling the recess 16' at least partially with a sacrificial material 20 may further comprise the step of filling the recess 16' at least partially with a carbon sacrificial material, i.e. a sacrificial material comprising carbon. The step 110' of filling the recess 16' at least partially with the sacrificial material may further comprise the steps of depositing a carbon layer as the sacrificial material 20 on the first insulator layer 14-2 and in the recess 16', and the step of structuring the carbon layer 20 so that the recess 16' is at least partially filled with the sacrificial material 20, wherein the edge region 16-1 of the recess 16' extends laterally beyond the pressure sensor structure 12.

The step 114 of forming the access port(s) 18' may further comprise the step of release etching (oxide etch), from a surface 104a of the metal-insulator-stack 14', towards the semiconductor substrate 10 for generating a kerf or trench as the recess port in the metal-insulator-stack 14' to the recess with the sacrificial material. The trench 18 may be formed to be at least partially circumferential and/or discontinuously in the metal-insulator-stack 14' with respect to the sensor structure 12. The access port(s) 18' may also be configured to form the pressure port(s) 18 through the metal-insulator-stack arrangement 14 for providing the fluidic connection between the cavity 16 and the environmental atmosphere.

The pressure port(s) 18 may have a cross-sectional area so that any square, rectangular or circular area formable in the pressure port (e.g. at the surface of the metal-insulator-stack arrangement 14) in parallel to a surface area 10a of the semiconductor substrate 10 is smaller than 2 µm²,1 µm², 0.5 µm², etc. The step 106' of forming the metal-insulator-stack 14' may further comprise the step of forming a plurality of insulator layer structures 14-2, 14-3 and a plurality of metal layer structures 14-4 on the semiconductor substrate. At least one metal layer structure 14-4 of the metal-insulator-stack 14' may be formed as a metal shield 22, which is at least partially arranged with respect to the surface region 10a of the semiconductor substrate 10 above the pressure sensor structure 12.

Thus, the step 104 of forming, during a BEOL process, a metal-insulator-stack arrangement 14 on the semiconductor substrate 10 may comprise the steps 106' (=108', 110' and 112') and 114', 116'. Moreover, optionally a hydrophobic and/or oleophobic surface layer 24 may be formed on the surface region 14a of the metal-insulator-stack 14' (arrangement 14).

Referring to and summarizing the above embodiments as described in FIGS. 1, 2, 3 and 4, a pressure port 18 is formed through the metal-insulator-stack arrangement 14 for providing a fluidic connection between the cavity 16 and the environmental atmosphere. The at least one pressure port 18 may comprise at least one hole (kerf or trench) through the metal-insulator-stack arrangement which may be fabricated as having various structural dimensions, such as round (cylindrical) holes, long (V-Shaped) trenches, curved holes or other geometries. As each pressure port has a cross-sectional area so that any square, rectangular area or round area (e.g. a circle) formable in the pressure port (e.g. at the surface 14a of the metal-insulator-stack arrangement 14 and) in parallel to a surface of the semiconductor substrate is smaller than 1 $\mu m^2$ etc., a closing of the pressure port(s), which could interfere or even disable the effective operation of the pressure sensing structure 12) by dust particles and/or humidity may be effectively inhibited.

According to embodiments, the pressure ports 18 may be connected sideways to the sensing array (pressure sensing structure 12). In such an embodiment, as shown for example in FIG. 4, the (large) buried cavity 16 extends over the area of the sensing membrane(s) 12 to a point 16-1 where the pressure port (hole) 18 is connected to the outer atmosphere.

According to a further embodiment, the part of the BEOL stack, which overlays the pressure sensing structure 12, combines with an inner metal shield 22 to protect from disturbing electric fields. The metal shield may be grounded or connected to a (suited) electric potential (reference potential).

According to further embodiments, a hydrophobic or oleophobic surface layer 24 may be implemented on the shield to support a protection from water or oily substances. Other surface layers may be implemented to protect from other substances.

As a general example, the fabrication process may be conducted as follows:
  completion of front-end-of-line processes for CMOS circuitry as well as mid-of-line implementation of pressure sensing lamellas
  partly applied BEOL fabrication, such as structuring of contacts, to position a first inter-layer dielectrics, etc.
  opening the BEOL structures at defined areas and deposition of carbon layer as a sacrificial material as well as structuring the carbon layer
  depositing and structuring of subsequent BEOL structures (dielectrics, metal layers, etc.). This may include a (buried) metal structure above the pressure sensing structure and/or (parts of) the sacrificial layer.

Figure 5A:
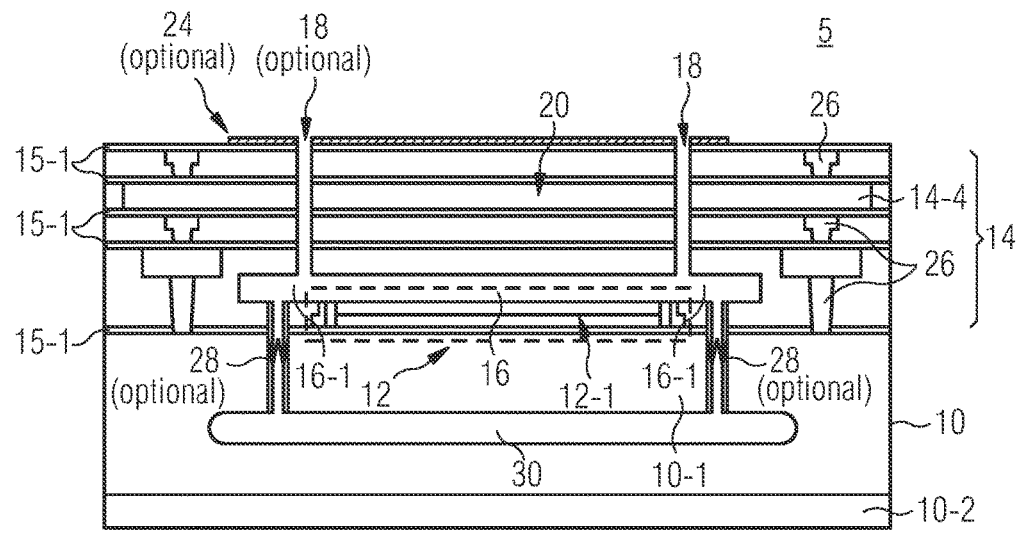
FIGS. 5a-b show schematic cross-sectional views of different, exemplary pressure sensor structures arranged at a semiconductor substrate according to embodiments.
Figure 5B:
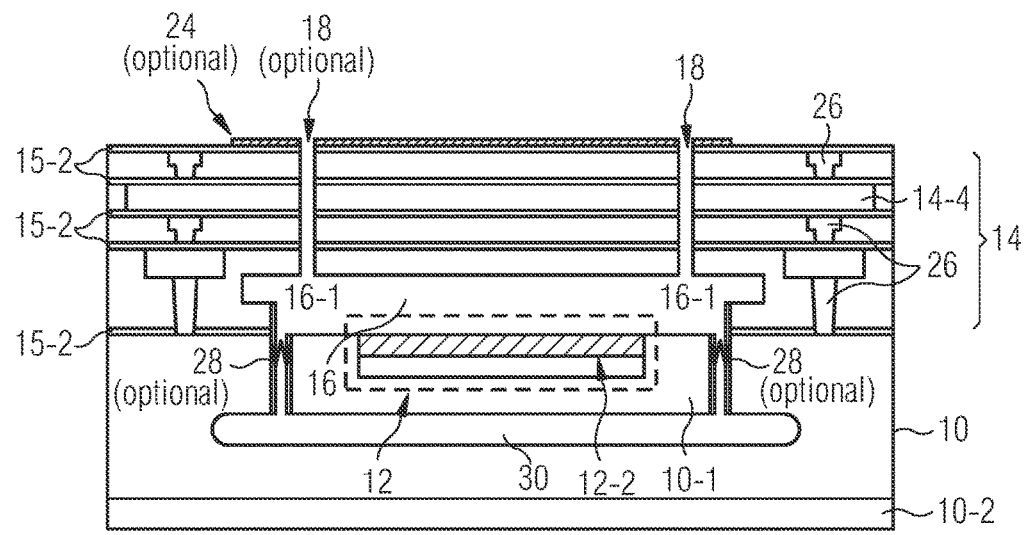

FIGS. 5a-b show schematic cross-sectional views of different, exemplary pressure sensor devices 5 according to further embodiments.

As shown in FIG. 5a-b, the pressure sensor device 5 comprises a semiconductor substrate 10 with a pressure sensor structure 12, a metal-insulator-stack arrangement 14 on the semiconductor substrate 10, wherein the metal-insulator-stack arrangement 14 comprises a cavity 16 adjacent to the pressure sensor structure 12 and extending over the pressure sensor structure 12. Further, the pressure sensor device 5 comprises at least one pressure port 18 through the metal-insulator-stack arrangement 14 for providing a fluidic connection between the cavity 16 and an environmental atmosphere, wherein the (each) pressure port 18 has a cross-sectional area, which is smaller than 10% of the footprint area of the pressure sensor structure 12, e.g. within/below the cavity 16.

Alternatively, the pressure port(s) 18 through the metal-insulator-stack arrangement 14 for providing a fluidic connection between the cavity 16 and the environmental atmosphere may have a cross-sectional area so that any square, rectangular area or circular area formable in the pressure port 18 in parallel to a surface region 10a of the semiconductor substrate 10 is smaller than 2 $\mu m^2$, 1 $\mu m^2$, 0.5 $\mu m^2$, 0.2 $\mu m^2$, or 0.1 $\mu m^2$ etc.

According to an embodiment, the cavity 16 may extend laterally beyond the pressure sensor structure 12, and wherein the pressure port 18 forms the fluidic connection through the metal-insulator-stack arrangement 14 to an edge region 16-1 of the cavity 16. Optionally, at least one metal layer structure 14-4 of the metal-insulator-stack arrangement 14 may be formed as a metal shield 22, which is, with respect to the semiconductor substrate 10, at least partially arranged above the pressure sensor structure 12. Moreover, electrically conductive vias 26 may be provided in the metal-insulator-stack arrangement 14 to provide an electrical connection to contact areas of (integrated) circuits (not shown in FIGS. 5a-b) on the semiconductor substrate 10, between different metal layer structures, to supply voltages etc. According to an embodiment, the device 5 may comprise an optional hydrophobic and/or oleophobic surface layer 24 on the metal-insulator-stack arrangement 14.

According to an embodiment as shown in FIG. 5a, the pressure sensor structure 12 may comprises a capacitive pressure sensor structure 12 with a poly-silicon lamella 12-1 on the semiconductor substrate 10.

According to a further embodiment as shown in FIG. 5b, the pressure sensor structure 12 comprises a piezo-resistive pressure sensor structure 12 with a silicon lamella 12-2 in the semiconductor substrate.

According to a further embodiment, the pressure sensor structure 12 comprises a mechanical spring structure 28 between a region 10-1 of the semiconductor substrate 10 carrying the pressure sensor structure 12 and a remaining semiconductor substrate region 10-2 for providing a mechanical stress decoupling of the pressure sensor structure 12 from the remaining semiconductor substrate region 10-2.

The remaining semiconductor substrate region 10-2 of the semiconductor substrate 10 may comprise a U-shaped (second) cavity 30 in which the a region 10-1 of the semiconductor substrate 10 carrying the pressure sensor structure 12 is stress decoupledly loaded or mounted by the stress decoupling structure 10-1. The U-shaped cavity 30, which may be fluidically connected to the (first) cavity 16 can be obtained, for example, by means of a so-called silicon-on-nothing process (or Venezia process).

Figure 5C:
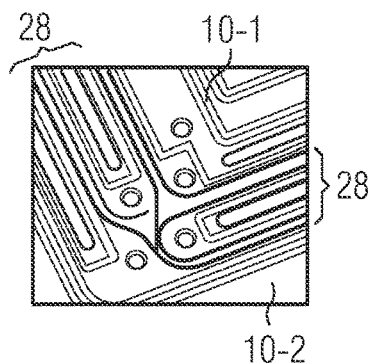
FIG. 5c shows an enlarged perspective view of an implementation of a mechanical spring structure of an exemplary pressure sensor structure according to an embodiment.

FIG. 5c shows an enlarged perspective view of an implementation of the mechanical spring structure 28 between the region 10-1 of the semiconductor substrate 10 carrying the pressure sensor structure 12 and the remaining semiconductor substrate region 10-2.

The insulator layer structures 14-2, 14-3 of the metal-insulator-stack arrangement 14 may comprise (thin) nitride layers 15-1 comprising a SiN material and covering (thicker) oxide layers 15-2 comprising a SiO material. The nitride layer(s) 15-1 may have a thickness in the range of 50 nm, e.g. between 30 und 100 $\mu m$. The oxide layer(s) 15-2 may have a thickness in the range of 500 to 700 nm, e.g. between 300 und 1000 $\mu m$.

For protection reasons (e.g. for humidity protection), the at least one metal layer structure 14-4, the inner surfaces of the pressure port(s) and/or the pressure sensor structure 12 may be (at least partially) covered with a (thin) nitride layer 15-1.

FIGS. 6a-e show schematic top views of different implementations of exemplary pressure ports 18 having different hole geometries or cross-sectional shapes according to further embodiments.

Figure 6A:
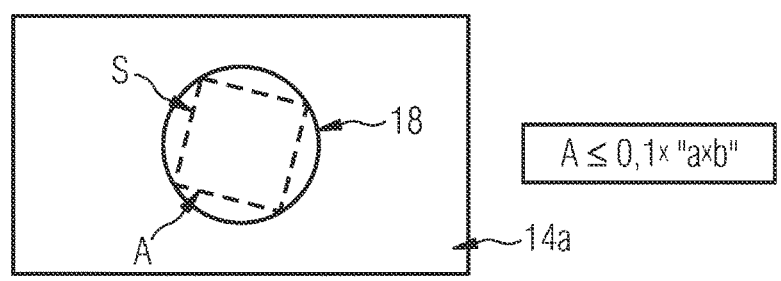
FIGS. 6a-e schematic top views of different exemplary pressure ports having different hole geometries according to embodiments.

According to the embodiment as shown in FIG. 6a, the at least one pressure port 18 through the metal-insulator-stack arrangement 14 has a cross-sectional area A (e.g. at the surface area 14a of the metal-insulator-stack and optionally through the complete metal-insulator-stack 14) which is smaller than 10% of the footprint area (a*b) of the pressure sensor structure 12 within/or below the cavity 16. Alternatively to the relative indication of size, as indicated above, the pressure port 18 through the metal-insulator-stack arrangement 16 may have a cross-sectional area (at the surface region 14a of the metal-insulator-stack 14, and optionally through the complete metal-insulator-stack 14) so that any square, rectangular area or circular area S formable in the pressure port 18 (at least at the surface region 14a of the insulator stack 14) and in parallel to a surface area 10a of the semiconductor substrate 10 is smaller than 2 µm, 1 µm$^2$, 0.5 µm$^2$, 0.2 µm$^2$, or 0.1 µm$^2$.

Figure 6B:
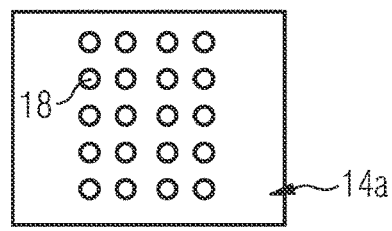
Figure 6C:
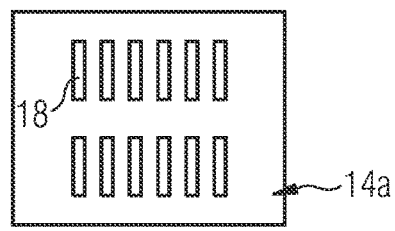
Figure 6D:
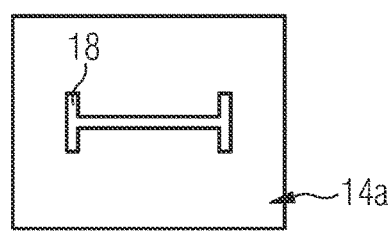
Figure 6E:
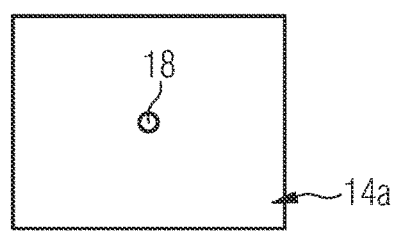

FIG. 6b shows an exemplary array of pressure ports 18 having a circular cross-sectional shape. FIG. 6c shows an exemplary array of pressure ports 18 having a rectangular cross-sectional shape. FIG. 6d shows an exemplary pressure port 18 having double-T cross-sectional shape (i.e. is composed of three rectangular sections). FIG. 6e shows an exemplary single pressure port 18 having a circular cross-sectional shape.

According to the above FIGS. 6a-e, embodiments of the pressure port(s) may have a simple, convex polygonal cross-sectional shape. In general, as pressure port 18, any simple polygon (i.e. the boundary of the polygon does not cross itself) can be used. Principally, the pressure port(s) 18 may be fabricated as various structures, such as round or elliptical holes, long trenches, curved holes or other geometries, which may inhibit closing of the holes by dust particles or humidity, etc.

A Pressure sensing system may comprise a plurality of pressure sensor devices 5, wherein the plurality of pressure sensor devices 5 may each comprise a protective shield for the pressure sensor structure on the semiconductor substrate, wherein the protective shield is formed by the metal-insulator-stack arrangement having the pressure port.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

In the foregoing Detailed Description, it can be seen that various features are grouped together in embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A manufacturing method, comprising:
   providing a semiconductor substrate having a pressure sensor structure; and
   forming, during a BEOL process (BEOL =back-end-of-line), a metal-insulator-stack arrangement on the semiconductor substrate, wherein the metal-insulator-stack arrangement is formed to comprise:
   a cavity adjacent to the pressure sensor structure and extending over the pressure sensor structure; and
   a pressure port through the metal-insulator-stack arrangement for providing a fluidic connection between the cavity and an environmental atmosphere, wherein the pressure port has a cross-sectional area, which is smaller than 10% of a footprint area of the pressure sensor structure.

2. The method according to claim 1, wherein the pressure port has a cross-sectional area so that any square, rectangular area or circular area formable in the pressure port in parallel to a surface area of the semiconductor substrate is smaller than 1 µm$^2$.

3. The method according to claim 1, wherein the step of forming, during the BEOL process, the metal-insulator-stack arrangement further comprises:
   forming, during the BEOL process, a metal-insulator-stack on the semiconductor substrate, wherein the metal-insulator-stack comprises a recess which is adjacent to the pressure sensor structure and extends over the pressure sensor structure, the recess being at least partially filled with a sacrificial material;
   forming an access port through the metal-insulator-stack to the sacrificial material in the recess; and
   forming the cavity by removing the sacrificial material through the access port.

4. The method according to claim 3, wherein the recess with the sacrificial material is formed to extend laterally beyond the pressure sensor structure, the method further comprising:
  forming the access port through the metal-insulator-stack to an edge region of the recess with the sacrificial material, wherein the edge region of the recess extends laterally beyond the pressure sensor structure.

5. The method according to claim 3, wherein the step of forming the access port further comprises:
  release etching, from a surface region of the metal-insulator-stack towards the semiconductor substrate, for generating a kerf or trench as the access port in the metal-insulator-stack to the recess with the sacrificial material.

6. The method according to claim 3, wherein the access port is also configured to form the pressure port through the metal-insulator-stack arrangement for providing the fluidic connection between the cavity and the environmental atmosphere.

7. The method according to claim 3, wherein the step of forming the metal-insulator-stack further comprises:
  forming a plurality of insulator layer structures and a plurality of metal layer structures on the semiconductor substrate.

8. The method according to claim 3, further comprising:
  forming a hydrophobic and/or oleophobic surface layer on the metal-insulator-stack.

9. The method according to claim 3, wherein the step of forming, during the BEOL process, the metal-insulator-stack further comprises:
  forming a first insulator layer structure on the semiconductor substrate, wherein the first insulator layer structure comprises the recess over the pressure sensor structure;
  filling the recess at least partially with a sacrificial material; and
  forming the remaining metal-insulator-stack by forming a further insulator layer structure and/or a metal layer structure on the first insulator layer structure and the sacrificial material.

10. The method according to claim 9, wherein the step of filling the recess at least partially with a sacrificial material further comprises:
  filling the recess at least partially with a carbon sacrificial material.

11. The method according claim 9, wherein the step of filling the recess at least partially with the sacrificial material further comprises:
  depositing a carbon layer as the sacrificial material on the first insulating layer structure and in the recess; and
  structuring the carbon layer so that the recess is at least partially with the carbon sacrificial material.

12. The method according to claim 9, wherein the step of removing the sacrificial material further comprises a carbon ashing process.

13. The method according to claim 9, wherein at least one metal layer structure of the metal-insulator-stack is formed as a metal shield, which is at least partially arranged with respect to a surface region of the semiconductor substrate above the pressure sensor structure.

14. The method according to claim 1, wherein the step of providing a semiconductor substrate with a pressure sensor structure further comprises:
  forming during a FEOL process (FEOL =front-end-of-line) with a standard CMOS process circuit elements on the semiconductor substrate; and
  forming during an MOL process (MOL =middle-of-line) the pressure sensor structure on the semiconductor substrate.

15. The method according to claim 14, wherein the pressure sensor structure comprises a capacitive pressure sensor structure with a poly-silicon lamella.

16. The method according to claim 14, wherein the step of forming the pressure sensor structure further comprises:
  forming a mechanical spring structure between a region of the semiconductor substrate carrying the pressure sensor structure and a remaining semiconductor substrate region for providing a mechanical stress decoupling of the pressure sensor structure from the remaining semiconductor substrate region.

17. The method according to claim 1, wherein the step of providing a semiconductor substrate with a pressure sensor structure further comprises:
  forming during a FEOL process with a standard CMOS process circuit elements on the semiconductor substrate and the pressure sensor structure in the semiconductor substrate.

18. The method according to claim 17, wherein the pressure sensor structure comprises a piezo-resistive pressure sensor structure with a silicon lamella in the semiconductor substrate.

19. A pressure sensor device, comprising:
  a semiconductor substrate with a pressure sensor structure;
  a metal-insulator-stack arrangement on the semiconductor substrate, wherein the metal-insulator-stack arrangement comprises a cavity adjacent to the pressure sensor structure and extending over the pressure sensor structure; and
  a pressure port through the metal-insulator-stack arrangement for providing a fluidic connection between the cavity and an environmental atmosphere, wherein the pressure port has a cross-sectional area, which is smaller than 10% of the footprint area of the pressure sensor structure.

20. The device according to claim 19, wherein the pressure port through the metal-insulator-stack arrangement for providing a fluidic connection between the cavity and the environmental atmosphere has a cross-sectional area so that any square, rectangular area or circular area formable in the pressure port in parallel to a surface region of the semiconductor substrate is smaller than 1 µm$^2$.

21. The device according to claim 19, wherein the cavity extends laterally beyond the pressure sensor structure, and wherein the pressure port forms the fluidic connection through the metal-insulator-stack arrangement to an edge region of the cavity.

22. The device according to claim 19, wherein at least one metal layer structure of the metal-insulator-stack arrangement is formed as a metal shield, which is, with respect to the semiconductor substrate, at least partially arranged above the pressure sensor structure.

23. The device according to claim 19, further comprising:
  a hydrophobic and/or oleophobic surface layer on the metal-insulator-stack arrangement.

24. The device according to claim 19, wherein the pressure sensor structure comprises a capacitive pressure sensor structure with a poly-silicon lamella on the semiconductor substrate.

25. The device according to claim 19, wherein the pressure sensor structure comprises a piezo-resistive pressure sensor structure with a silicon lamella in the semiconductor substrate.

26. The device according to claim 19, wherein the pressure sensor structure comprises a mechanical spring structure between a region of the semiconductor substrate carrying the pressure sensor structure and a remaining semiconductor substrate region for providing a mechanical stress decoupling of the pressure sensor structure from the remaining semiconductor substrate region.

\* \* \* \* \*